UNITED STATES PATENT OFFICE.

WILLIAM C. TILTON, OF DALTON, GEORGIA, ASSIGNOR OF ONE-HALF HIS RIGHT TO BENJAMIN S. STORY, OF NEW ORLEANS, LOUISIANA.

IMPROVEMENT IN LUBRICATING COMPOUNDS.

Specification forming part of Letters Patent No. 157,108, dated November 24, 1874; application filed October 6, 1874.

*To all whom it may concern:*

Be it known that I, WILLIAM C. TILTON, of Dalton, in the county of Whitfield and State of Georgia, have invented certain new and useful Improvements in Car-Axle Grease; and I do hereby declare the following to be a full, clear, and exact description of the invention, such as will enable others skilled in the art to which it pertains to make and use it, reference being had to the accompanying drawings, which form part of this specification.

My invention relates to a preparation of a lubricating compound, to be used upon axles and heavy machinery of all kinds.

I take one hundred parts of lubricating-oil, such as lard, sperm, or mineral; sixty parts of grease, such as tallow, vegetable or animal oils, or grease; fifty-five parts of rosin-oil; and seventy parts of pulverized soap-stone, and mix them thoroughly together in any suitable manner. These proportions may, of course, be slightly varied, if so desired. When thus incorporated they form an axle-grease of very superior qualities.

Having thus described my invention, I claim—

A lubricating compound in or about the proportions of one hundred parts of lubricating oil, sixty parts grease, fifty-five parts rosin-oil, and seventy parts pulverized soap-stone, as described.

In testimony that I claim the foregoing I have hereunto set my hand this 24th day of August, 1874.

WILLIAM CAPERS TILTON.

Witnesses:
W. J. M. THOMAS,
C. A. TREVITT.